US012104654B2

(12) United States Patent
Eş et al.

(10) Patent No.: US 12,104,654 B2
(45) Date of Patent: Oct. 1, 2024

(54) LINING SYSTEM WITH SENSOR

(71) Applicant: DÖNMEZ DEBRİYAJ SANAYİ VE TİCARET ANONİM ŞİRKETİ, Izmir (AR)

(72) Inventors: Caner Eş, Izmir (AR); ibrahim Can Kaymaz, Izmir (AR); Ömer Yildiz, Izmir (AR); Orhan Karabulut, Izmir (AR); Ulaşcan Kurt, Izmir (AR)

(*) Notice: Subject to any disclaimer, the term of this patent is extended or adjusted under 35 U.S.C. 154(b) by 0 days.

(21) Appl. No.: 18/003,787

(22) PCT Filed: Jul. 20, 2022

(86) PCT No.: PCT/TR2022/050771
§ 371 (c)(1),
(2) Date: Dec. 29, 2022

(87) PCT Pub. No.: WO2023/204778
PCT Pub. Date: Oct. 26, 2023

(65) Prior Publication Data
US 2024/0093742 A1    Mar. 21, 2024

(30) Foreign Application Priority Data
Apr. 20, 2022 (TR) ................ 2022/006302

(51) Int. Cl.
*F16D 13/71* (2006.01)

(52) U.S. Cl.
CPC .......... *F16D 13/71* (2013.01); *F16D 2300/18* (2013.01)

(58) Field of Classification Search
CPC ....... F16D 13/00–76; F16D 66/00–028; F16D 2300/18; F16D 2066/003
See application file for complete search history.

(56) References Cited

FOREIGN PATENT DOCUMENTS

| CN | 201050559 | | 4/2008 | |
|---|---|---|---|---|
| DE | 102009005738 | A1 | 8/2009 | |
| RU | 2238451 | C2 * | 10/2004 | ........... F16D 13/585 |
| TR | 2019/02539 | | 3/2019 | |
| WO | 2019059866 | A2 | 3/2019 | |
| WO | 2021230837 | A1 | 11/2021 | |

OTHER PUBLICATIONS

International Search Report and Written Opinion of the International Searching Authority for corresponding PCT/TR2022/050771, dated Nov. 11, 2022.

* cited by examiner

*Primary Examiner* — Ernesto A Suarez
*Assistant Examiner* — James J Taylor, II
(74) *Attorney, Agent, or Firm* — Egbert, McDaniel & Swartz, PLLC

(57) ABSTRACT

Disclosed is a system for measuring the wear condition due to friction in a clutch system, which is widely used in the automotive industry.

1 Claim, 3 Drawing Sheets

LINING SYSTEM WITH SENSOR

TECHNICAL FIELD

Figure 1:
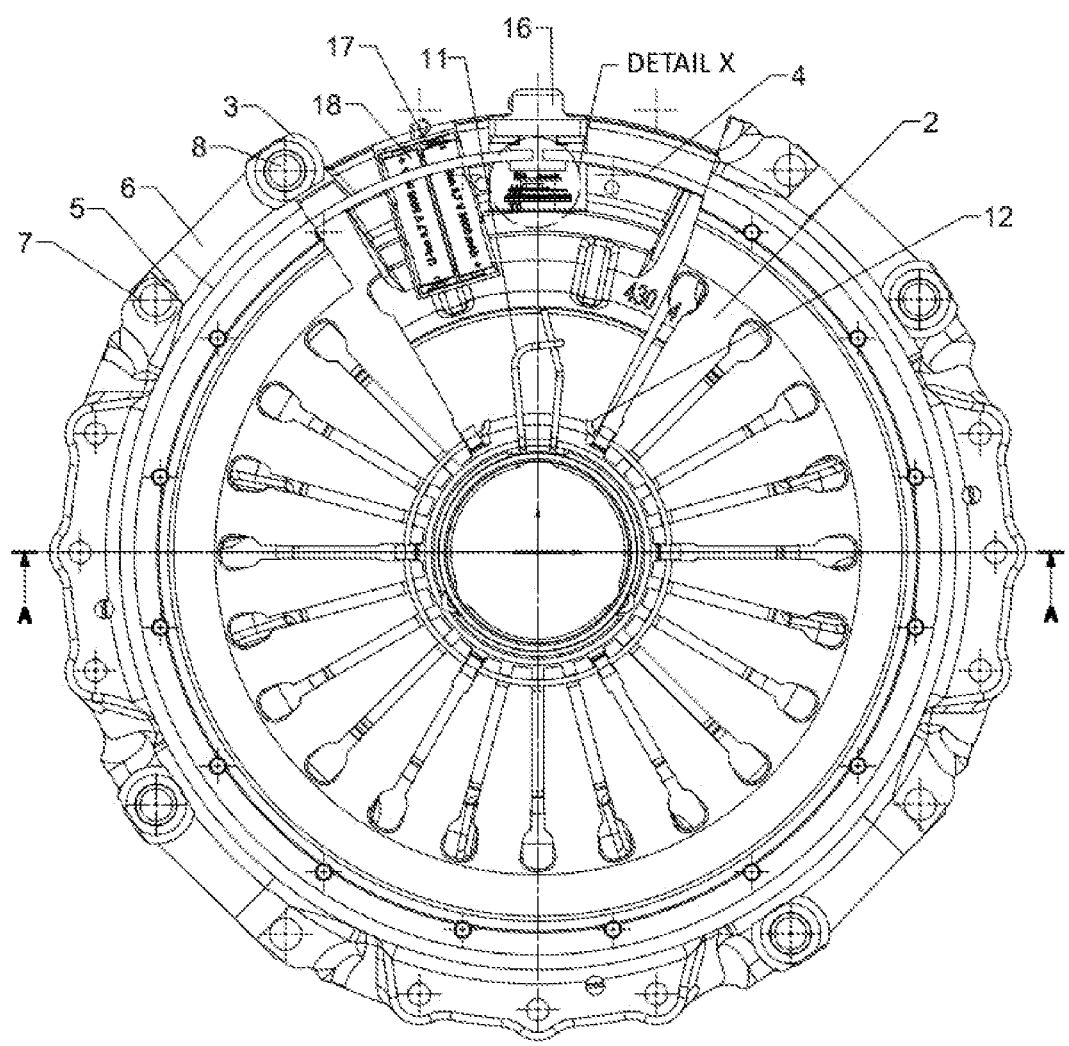

The invention relates to a system that provides to measurement of the wear condition due to friction in the clutch system, which is widely used in the automotive industry.

PRIOR ART

A clutch is one of the powertrains that provide the opportunity to change gear by cutting the connection between the engine and the gearbox.

The clutch is a subsystem that provides the engine to transfer the driving moment to the gearbox and cut it off. It also provides the achievement of high inertial loads with a small load. To be able to give the required driving moment on the first take-off, it is necessary to bring the engine to a certain number of cycles. This is possible if only the engine and its connection to the gearbox are disconnected. There are two types of its dry friction and hydrodynamic.

In current clutch systems, the friction-related wear can only be noticed at the end of its life, due to the slip that the user can experience during the clutch, and consequently the inability to transmit the engine power to the driveline, or with the help of the central bearing connected to the CAN (Controller Area Network) line. Delayed life determination may cause operational delays, especially for heavy commercial vehicles. These delays create serious financial disadvantages. In addition, the damage that the clutch disc may cause to the lower parts to which it is connected may also increase these financial disadvantages.

The fact that life cannot be seen momentarily in the clutch systems that are actively used today leads to serious losses, especially in the class of heavy commercial vehicles, and these losses cannot be eliminated with the limited capabilities of existing systems.

As a result of the research conducted on the subject, the application entitled "Bearing wear detection system" No. 2019/02539 was found. In the system, a lining wear detection system is described, which is used in air drum brake systems with an automatic gap adjuster, which is used to slow down or stop the vehicles called semi-trailers, used in the transportation of large-sized, heavy loads, and notifies the user of the wear status of the linings visually and/or audibly. The system performs a measurement based on the detection of the radial movement made by the automatic gap adjuster on the gear.

Therefore, the existence of the above problems and the inadequacy of the existing solutions made it necessary to make an improvement in the related technical field.

Purpose of the Invention

The invention is inspired by current situations and aims to solve the negatives mentioned above.

The main purpose of the invention is to create a system that provides the clutch life to be fed to the CAN line of the vehicle instantly with the help of adding a wireless sensor to the pressure plate of the clutch system.

Another purpose of the invention is to create a system that provides the wear caused by an angular encoder, battery, communication card and wifi card to be placed on the pressure plate to be instantly transferred to the CAN line and displayed on the vehicle dashboard.

For the fulfilment of the above-described purposes, the invention is a system for measuring the wear condition due to friction in a clutch system. Accordingly, the system;

the retainer that holds all the elements that make up the system together, diaphragm-spring, which applies the force required to transfer the torque from the engine to the gearbox during grip, fulcrum ring, which is placed between the said retainer and the diaphragm-spring, provides to creating a support point on the said diaphragm-spring, pressure plate that provides grip and separation in the clutch system, the battery on the said pressure plate, which provides the necessary energy for the system to work, the battery that is placed in the said battery and provides electrical energy, angular encoder that detects the wear on the clutch lining, processor circuit that provides to storing all received data and connecting electronic circuits, communication circuit that transfers the information received from the system to the communication circuit in the CAN connection, the charging unit card that provides the battery in the mentioned pressure plate to be charged, the support sheet bar that performs the separation in the clutch system and connects the said pressure plate and the retainer, a washer that prevents deformation between the rivet and the lower part to which the connection is made, the pressure plate rivet connecting the said pressure plate and the support sheet bar, release ring, which is the intermediate piece that provides the mounted of the bearing assembly, the movement segment that provides the said release ring to move, the segment connecting the release ring and the bearing, the stop ring that prevents the support sheet bars from being damaged from the time of manufacture of the thrust to the installation of the vehicle, the retainer rivet that assembles said retainer, support sheet bar, stop ring and pressure plate together contains.

The structural and characteristic features of the invention and all its advantages will be understood more clearly thanks to the figures given below and the detailed description written with references to these figures, and therefore the evaluation should also be carried out taking into account these figures and the detailed description.

FIGURES TO HELP UNDERSTANDING THE INVENTION

FIG. 1 gives an image of the system that is the subject of the invention.

Figure 2:
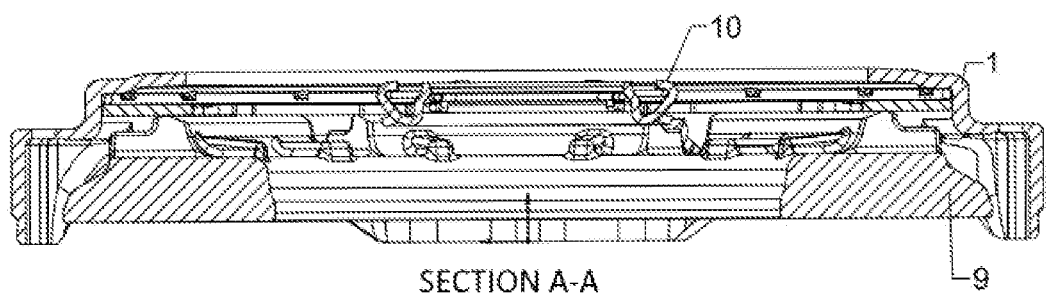

FIG. 2 gives a detailed image of the A-A section.

Figure 3:
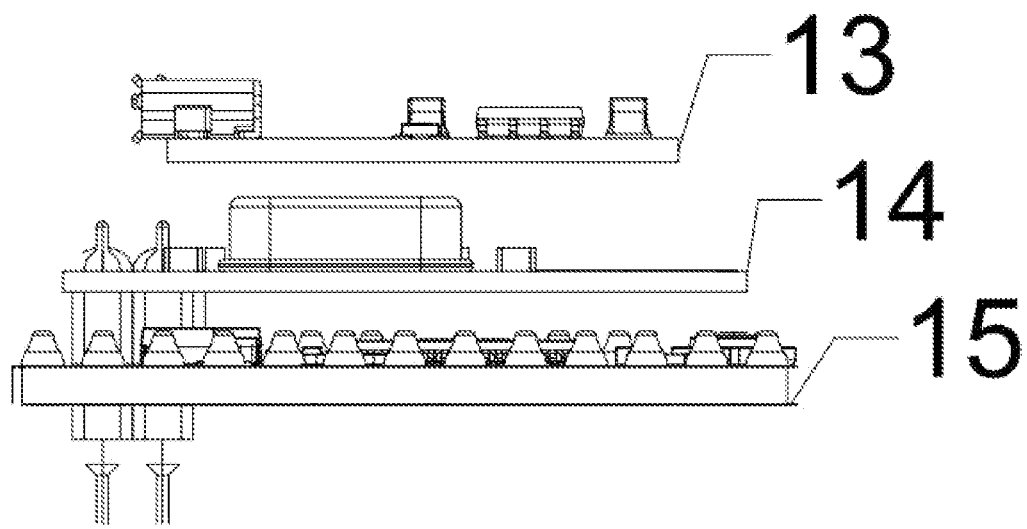

FIG. 3 gives a detailed image of detail X.

DESCRIPTION OF PART REFERENCES

1. Retainer
2. Diaphragm-spring
3. Stop ring
4. Fulcrum ring
5. Washer
6. Support sheet bar
7. Pressure plate rivet 8. Retainer rivet
9. Pressure plate
10. Release ring
11. Movement segment
12. Segment
13. Charger unit board
14. Communication circuit
15. Processor circuit
16. Angular encoder
17. Battery
18. Cell battery

DETAILED DESCRIPTION OF THE INVENTION

In this detailed explanation, preferred embodiments of the system subject to the invention are explained only for a better understanding of the subject.

The invention is a system for measuring the wear condition due to friction in a clutch system. FIG. 1 shows an image of the system that is the subject of the invention. Accordingly, the system includes; the retainer (1) that holds all the elements that make up the system together, the diaphragm-spring (2) that applies the force required to transfer the torque from the engine to the transmission during grip, the fulcrum ring (4), which provides a support point on the diaphragm-spring (2) by being placed between the said retainer (1) and the diaphragm-spring (2), pressure plate (9) that provides grip and release in the clutch system, battery (17), located on the said pressure plate (9) and providing the necessary energy for the operation of the system, the cell battery (18) placed in the said battery (17) and providing electrical energy, angular encoder (16) that detects the wear on the clutch lining, the processor circuit (15), which stores all the received data and enables the electronic circuits to be connected, communication circuit (14), which transfers the information received from the system to the communication circuit in the CAN connection, charger unit board (13), which enables the battery (17) located on the said pressure plate (9) to be charged, the support sheet bar (6), which performs the separation in the clutch system and connects the said pressure plate (9) and the retainer (1), a washer (5) that prevents deformation between the rivet and the lower part to which the connection is made, the pressure plate rivet (7) connecting the said pressure plate (9) with the support sheet bar (6), release ring (10), which is the spacer piece that enables the assembly of the bearing, the movement segment (11) that enables the said release ring (10) to move, the segment (12) connecting the release ring (10) and the bearing, the stop ring (3) that prevents the support plates (6) from being damaged from the time of manufacture of the thrust to the installation of the vehicle, the retainer rivet (8) that assembles the said retainer (1), the support sheet bar (6), the stop ring (3) and the pressure plate (9) together.

By way of the components connected with the processor circuit (15) in our clutch system, which is the subject of the invention, the amount of wear on the lining surface due to dry friction is transferred to the user.

Clutch pressure is formed by assembling retainer (1), diaphragm-spring (2), stop ring (3), fulcrum ring (4), support sheet bar (6), pressure plate rivet (7), retainer rivet (8), pressure plate (9), release ring (10), movement segment (11), segment (12) and washer (5).

The retainer (1) is the part that holds the lower parts together by mounting with the pressure plate (9). It is mounted with a flywheel in the system. The diaphragm-spring (2) is the spring system that applies the force required to transfer the torque from the engine to the transmission during the grip. The stop ring (3) is the part that prevents the support sheet bars (6) from being damaged from the time of production to the assembly of the pressure assembly. The fulcrum ring (4) is the part placed between the retainer (1) and the diaphragm-spring (2) to create a support point on the diaphragm-spring (2). The washer (5) is the part placed between the rivet and the lower part to which it is connected to prevent deformation. The support sheet bar (6) is the part that performs the separation in the clutch system and connects the pressure plate (9) with the retainer (1). It separates the pressure plate (9) from the clutch disc when the pedal is pressed. The pressure plate rivet (7) is the part that connects the pressure plate (9) and the support sheet bar (6). The retainer rivet (8) is the rivet that holds the stop ring (3), the support plate (6), the retainer (1) and the pressure plate (9) together.

The pressure plate (9) is the part that provides the grip. By adding the angular encoder (16) to the pressure plate (9) of the clutch system, the clutch life will be transmitted to the CAN line of the vehicle instantly. In the new design, the angular encoder (16), the charger unit board (13), the communication circuit (14) preferably characterized as the Wi-Fi card, and the processor circuit (15), preferably characterized as the Arduino card, will be placed on the battery pressure plate (9). The angular encoder (16) is the auxiliary element that allows it to perform its function by touching the flywheel surface at a distance of 3.4 mm, which is the contact surface. This distance will decrease as the lining wears down, and the angular encoder (16) will move angularly with the line inside and transfer the mm value to the communication circuit (14) according to its degree. All these systems are connected to the processor circuit (15) and the battery (17) supplies the processor circuit (15).

The invention claimed is:
1. A system for measuring a wear condition, the system comprising:
   a clutch system having a retainer and a clutch lining and a bearing, the retainer adapted to hold said clutch system together;
   a diaphragm spring adapted to apply a force required to transfer torque from an engine to a gear box;
   a fulcrum ring cooperative with said diaphragm spring so as to form a support point on said diaphragm spring, said fulcrum ring positioned between the retainer and said diaphragm spring;
   a pressure plate gripping and releasing said clutch system;
   a battery positioned on said pressure plate, said battery adapted to provide energy to said clutch system;
   a cell battery positioned on said battery;
   an angular encoder adapted to detect the wear condition on the clutch lining;
   a processor circuit cooperative with said angular encoder and adapted to store data received from said angular encoder;
   a communication circuit adapted to transfer information received from said clutch system by a CAN connection;
   a charger unit board connected to said battery on said pressure plate so as to charge said battery;
   a support sheet bar cooperative with said clutch system so as to separate said clutch system, said support sheet bar connecting said pressure plate with the retainer;
   a pressure plate rivet connecting said pressure plate with said support sheet bar;

a washer positioned on said pressure plate rivet and adapted to prevent deformation between said pressure plate rivet and a lower portion of said support sheet bar;

a release ring in said clutch system;

a movement segment cooperative with said release ring so as to cause a movement of said release ring;

a segment connecting said release ring and the bearing;

a stop ring cooperative with said support sheet bar so as to prevent said support sheet bar from being damaged; and a retainer rivet assembled onto said retainer and on said support sheet bar and said stop ring and said pressure plate.

\* \* \* \* \*